United States Patent [19]

Six et al.

[11] 3,941,252

[45] Mar. 2, 1976

[54] CRANE WITH REMOVABLE SUPERSTRUCTURE

[75] Inventors: John W. Six, Hixson; Virgil F. Kramer, Signal Mountain, both of Tenn.

[73] Assignee: Koehring Company, Milwaukee, Wis.

[22] Filed: Jan. 23, 1975

[21] Appl. No.: 543,501

[52] U.S. Cl. .................................. 212/69; 280/435
[51] Int. Cl.² ........................................ B66C 23/84
[58] Field of Search .............................. 212/65–69, 212/58 R, 58 A, 59 R, 59 A; 280/433, 435, 438 A

[56] References Cited
UNITED STATES PATENTS

| | | | |
|---|---|---|---|
| 2,139,960 | 12/1938 | Kauffman | 212/69 |
| 2,513,726 | 7/1950 | Huston | 212/69 |
| 3,125,226 | 3/1964 | Mork et al. | 212/68 |
| 3,131,818 | 5/1964 | Allin, Jr. | 212/69 |
| 3,632,145 | 1/1972 | Davis et al. | 280/435 |
| 3,713,544 | 1/1973 | Wallace et al. | 212/69 |

Primary Examiner—Robert J. Spar
Assistant Examiner—Lawrence J. Oresky
Attorney, Agent, or Firm—Burns, Doane, Swecker & Mathis

[57] ABSTRACT

Methods and apparatus are disclosed for releasably connecting a crane superstructure and a crane carrier. The apparatus includes a segmented clamp assembly which hydraulically engages mating flanges carried by the superstructure and the carrier respectively. The clamp assembly includes an arcuate segment to which two other arcuate segments are pivotally connected. The mating flanges may be tapered and one may comprise a lower appendage of the turntable. Centering devices are disclosed to assure proper positioning of the mating flanges during assembly. Suitable tensioning means are provided to create a tensile stress in the clamp and thereby wedge the mating flanges together. The methods disclosed concern disconnecting, attaching, and securing a crane superstructure to a carrier by circumferentially clamping mating flanges therebetween.

15 Claims, 8 Drawing Figures

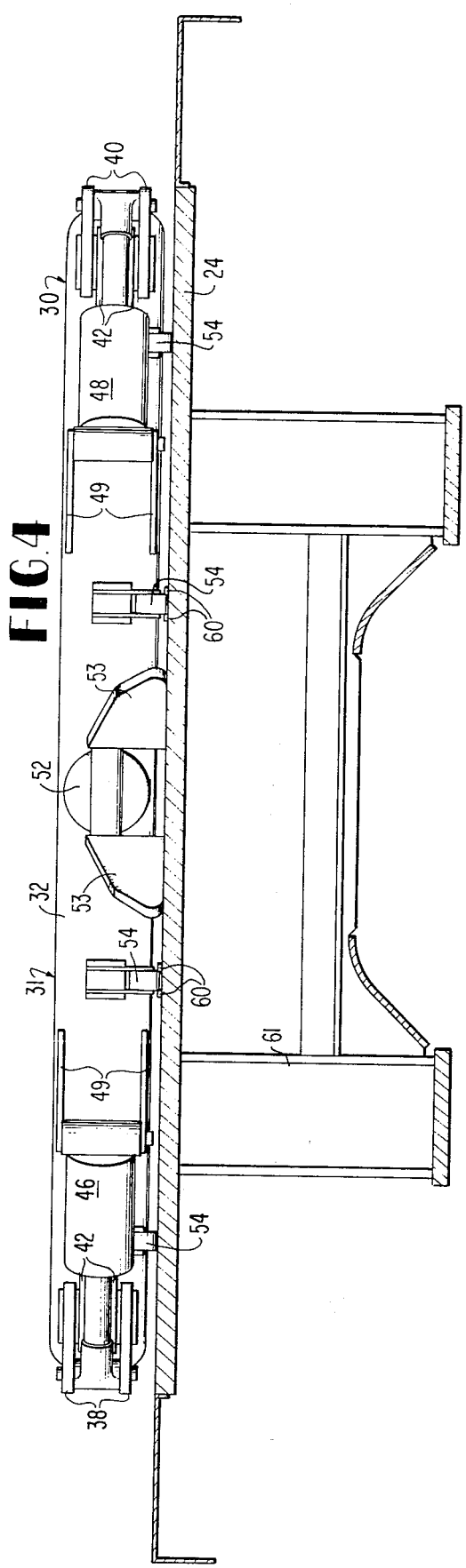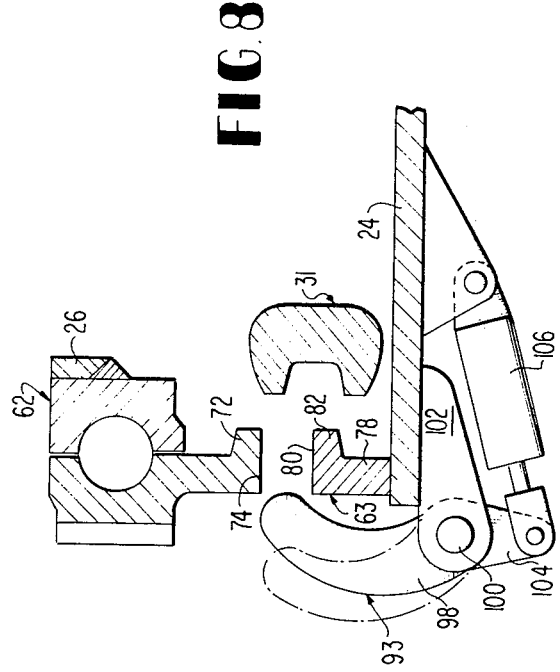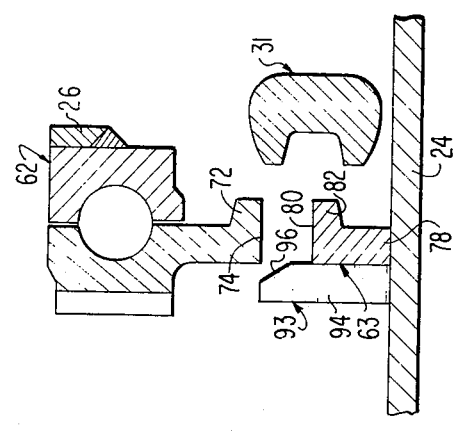

CRANE WITH REMOVABLE SUPERSTRUCTURE

BACKGROUND OF THE INVENTION

This invention concerns coupling assemblies for connecting a crane superstructure to a corresponding carrier. More specifically, the invention relates to a releasable mounting clamp for connecting a superstructure and a carrier.

In the past, the most common and most widely used method for attaching a crane superstructure and the turntable on which it rotates to a motorized carrier has been to bolt the turntable directly to the deck of the carrier. Problems have arisen with the transportation and use of large cranes, such as those having large external dimensions and weights which may exceed 100,000 lbs. One such problem relates to the time and effort required to disassemble a crane superstructure from the carrier therefor.

Enactment of highway use laws by various states has placed limits on the size and weight of motor vehicles that may lawfully traverse highways of the respective states. In view of the large dimensions and massive weight associated with a large motorized crane, the crane is often partially disassembled into several subassemblies that are transported independently of one another to a job site. Typically, a crane is disassembled into a number of subassemblies such as a boom assembly, an upper assembly comprising the crane superstructure and a lower assembly comprising the carrier.

Where the turntable of the superstructure is mounted on the deck of a carrier in accordance with the widely used method, as many as 50 separate bolts have been required. Needless to say, the assembly and disassembly of the carrier and superstructure subassemblies alone necessitates a substantial expenditure of time on every occasion when either assembly or disassembly must be effected. Moreover, since the crane is inoperative during assembly, the loss of productive time increases expenses of the owner above the expense naturally concomitant with having workmen effect the crane assembly by installing 50 or more bolts.

One approach to reducing the time and expense associated with crane assembly and disassembly operation has involved the use of a tang and wedge system in which a plurality of downwardly extending tangs on the turntable of a crane must be aligned with slots of a carrier and locked in place by multiple part adjustable wedges. Although some time savings are claimed for such systems, it is believed that they in turn present practical disadvantages, and there has remained a need for truly practical apparatus which can be actuated rapidly to disconnect, and connect, the superstructure and carrier without substantial expenditures of time and effort.

SUMMARY OF THE INVENTION

According to a preferred embodiment of this invention, a releasable connector assembly which facilitates rapid assembly and disassembly of a crane superstructure and an associated carrier includes a segmented clamping ring having a groove that receives a pair of mating flanges. One mating flange is connected to the superstructure and the second mating flange is mounted on the deck of the carrier. The clamping ring in combination with the mating flanges reduces the number of parts which must be manipulated to effect either assembly or disassembly of a crane.

The segmented clamping ring preferably includes a first arcuate segment to which a pair of arcuate segments are pivotally connected. The arcuate segments enable the clamping ring to be opened such that a radial clearance is defined between the clamping ring and the mating flanges. The radial clearance facilitates receipt and removal of the superstructure mating flange from the connector assembly.

To improve the connection between the superstructure and the carrier, the mating flanges may be tapered by providing frustoconical surfaces. Similarly, the groove of the clamping ring may be tapered by providing frustoconical sides to generally conform the groove cross-section with the cross-sectional configuration of the mating flanges. With tapered flange surfaces and a tapered groove, the connector assembly functions as a cam to draw and wedge the mating flanges securely together.

When a wedging function is particularly desired, the clamping ring may be provided with suitable tensioning means for creating tensile forces circumferentially therein. These tensile forces have a tendency to constrict the clamping ring about the mating flanges and thereby exert even greater clamping forces to draw the mating flanges together.

Where the present invention is used with large cranes, the size and weight of the clamping ring may become significant. Accordingly, suitable powered actuation means may be provided to manipulate and articulate segments of the clamping ring relative to one another and to move the clamping ring itself relative to the mating flanges. In this manner, the need for time and workmen to prepare a crane for disassembly or to complete the crane assembly is substantially reduced. In addition to the time savings effected, the use of powered actuators makes possible a uniform clamping force on the mating flanges by eliminating reliance on the skill of workmen and special tools.

During superstructure positioning on the carrier, it will often be necessary to align and center both mating flanges relative to one another. To facilitate such alignment, the mating flanges may be provided with suitable centering means which may be either active or passive. The centering means assures that the mating flanges will be properly positioned to receive the clamping ring and thereby eliminates costly and time consuming repeated attempts at proper positioning by physically lifting and repositioning the superstructure relative to the carrier.

As noted, with large cranes the clamping ring may be very large and heavy. When the clamping ring is moved away from the mating flanges, it may be desirable to provide suitable supporting means to maintain the proper spatial relationship between the clamping ring, the carrier deck and the mating flanges. A suitable supporting means may be carried directly by the clamping ring and may rollingly engage the carrier deck. The supporting means, moreover, may be effectively used to provide general radial alignment between the mating flanges and the groove of the clamping ring.

BRIEF DESCRIPTION OF THE DRAWINGS

Many objects and advantages of the present invention will be apparent to those skilled in the art when this specification is read in conjunction with the accompanying drawings wherein like reference numerals have been applied to like elements and wherein:

FIG. 4 is a partial cross-sectional view taken along line 4—4 of FIG. 3 with the superstructure removed for clarity;

FIG. 7 is a view in partial cross-section similar to FIG. 6 with the superstructure spaced from the carrier to illustrate one embodiment of a centering means; and FIG. 8 is a view in partial cross-section similar to FIG. 6 which illustrates another embodiment of a centering means.

DESCRIPTION OF THE PREFERRED EMBODIMENTS

Figure 1:
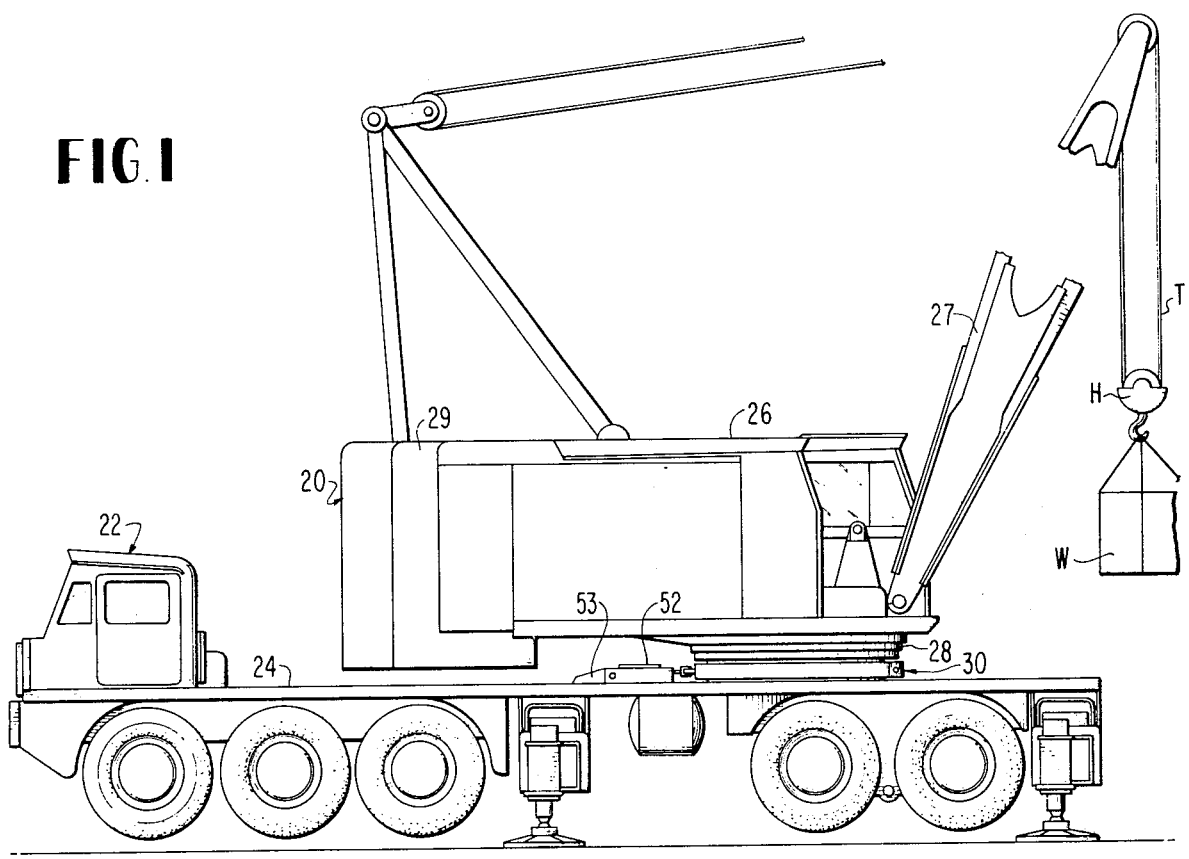
FIG. 1 is a partial elevational view of a crane.

Depicted in FIG. 1 is a large motorized crane 20 which includes a pneumatic-wheeled carrier 22 having a deck 24 on which rotatably mounted crane superstructure 26 is secured. A turntable 28 is conventionally provided to permit relative motion between the crane superstructure and the carrier 22. Typically, the turntable 28 may include a large diameter ball bearing assembly or the like.

The crane 20 is ordinarily provided with an engaging tool such as a hook, H, for engaging a load such as a weight, W. The crane 20 also includes means, such as a boom assembly 27, operatively connecting the engaging tool to the superstructure 26. One end of the boom assembly 27 may be pivotally connected to the superstructure 26 for controlled movement in a generally vertical plane. The engaging tool may be carried by the other end of the boom assembly 27 and may be supported by a suitable hoisting means such as a block and tackle, T.

When it is desired to disassemble a large motorized crane 20, for long distance transportation as an example, the crane is frequently separated into subassemblies such as the carrier 22, the superstructure 26, a boom assembly 27 and a counterweight assembly 29. The carrier 22 may have a weight upwards of 70,000 lbs. Similarly, the superstructure 26 may weigh upwards of 30,000 lbs.

In accordance with the present invention, the crane superstructure 26 is releasably connected to the carrier 22 by a segmented mounting clamp assembly, generally designated as 30, with the turntable 28 being a portion of the superstructure 26.

Figure 2:
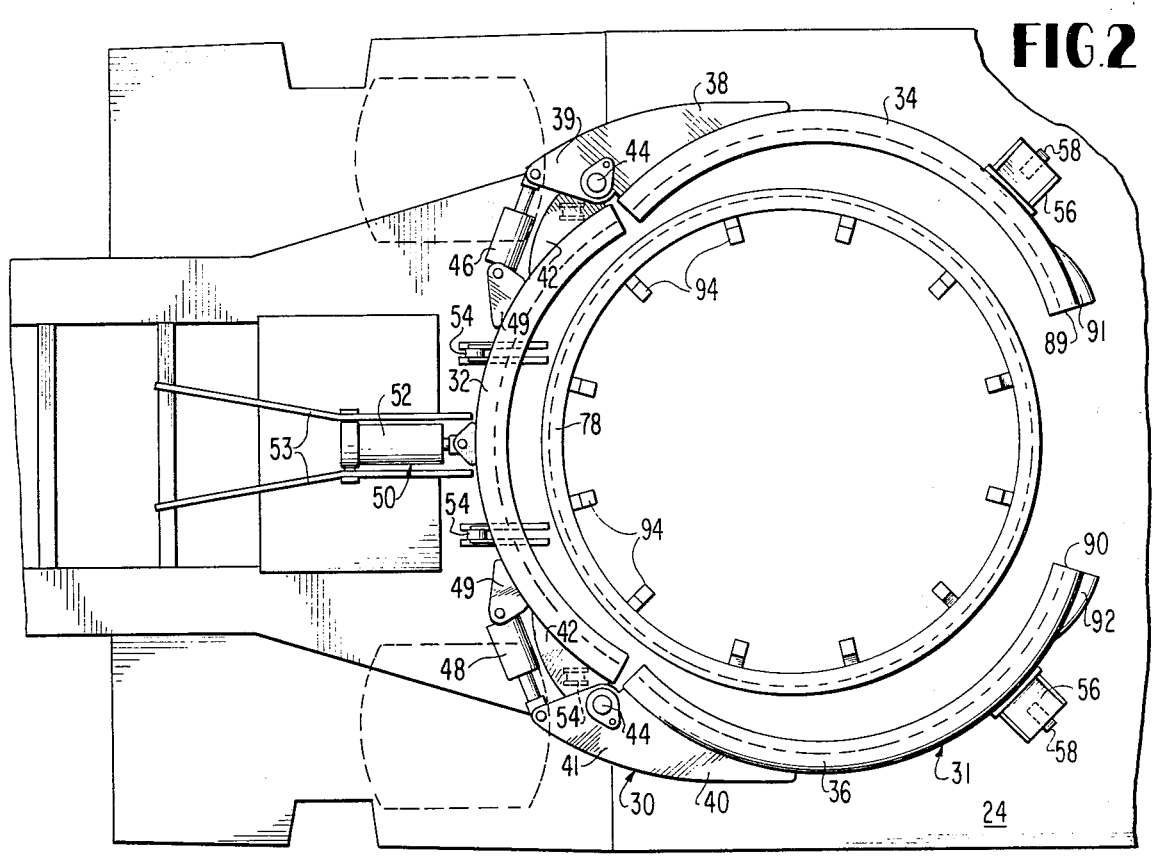
FIG. 2 is a partial plan view of a carrier with the clamping ring in an open and pulled-back configuration and with the superstructure removed for clarity.

Turning now to FIG. 2, the releasable mounting clamp assembly 30 includes a segmented clamping ring means 31. As illustrated, the segmented clamping ring 31 may include a generally arcuate pivot member or segment 32 and generally arcuate segments 34, 36. The generally arcuate segments 32, 34, 36 may be of approximately the same length and substantially encompass the circumference of a generally circular mounting support 78 (see FIG. 3). Alternatively, it would be possible for the arcuate segments to have unequal lengths.

The first arcuate segment 32 is provided with a pair of laterally outwardly projecting arms 42 at each end thereof. Each pair of arms 42 carries a suitable pivot pin 44.

One end of the second arcuate segment 34 is provided with a pair of arms 38 having extensions 39 that project laterally outwardly and which are pivotally mounted on one pivot 44 at one end of the first arcuate segment 32. Similarly, one end of the third arcuate segment 36 is provided with a pair of arms 40 having extensions 41 projecting laterally outwardly and which are pivotally mounted on the pivot pin 44 at the other end of the first arcuate segment 32.

A suitable articulating means is provided to rotate the pivotally mounted arcuate segments 34, 36 relative to the first arcuate segment 32. The articulating means may comprise, for example, a pair of hydraulic cylinders 46, 48 positioned such that one hydraulic cylinder is disposed at each end of the first arcuate segment 32. Each hydraulic cylinder 46, 48 has one end pivotally mounted to a corresponding bracket 49 that is attached to the first arcuate segment 32. The other end of each hydraulic cylinder is pivotally mounted to a corresponding extension 39, 41 of the arms 38, 40 respectively. The hydraulic cylinders 46, 48 provide powered movement of the arcuate segments 34, 36 relative to the first arcuate segment 34 during assembly and disassembly of the superstructure and the carrier.

To move the entire segmented clamping ring 31 relative to the deck 24 of the carrier and relative to mating flanges, a suitable positioning means 50 may be provided. Typically, the positioning means 50 may comprise a conventional hydraulic cylinder 52 having one end pivotally connected approximately midway between the ends of the arcuate segment 32 to minimize bending moments exerted on the hydraulic cylinder 52 from misalignment between the first arcuate segment 32 and the circular mounting support 78. A second end of the hydraulic cylinder 52 may be suitably connected to laterally disposed, vertically upstanding plates 53. The plates 53 may also be effective in limiting the distance which the segmented clamping ring may be retracted from the circular mounting support 78 (see FIG. 2).

When dealing with particularly large cranes it will be apparent that the size and weight of the segmented clamping ring 31 may be such that suitable supporting means should be provided to facilitate movement and positioning thereof. For example, the arcuate segments 32, 34, 36 may each weigh in the neighborhood of 800 lbs. Accordingly, the first arcuate segment 32 may be provided with suitable rollers to rollingly support the first arcuate segment 32 with respect to the deck 24 of the carrier. As illustrated in FIG. 4, the first arcuate segment 32 is supported by four laterally spaced rollers 54, each of which is mounted below the first arcuate segment 32 on a generally horizontal axis.

Figure 3:
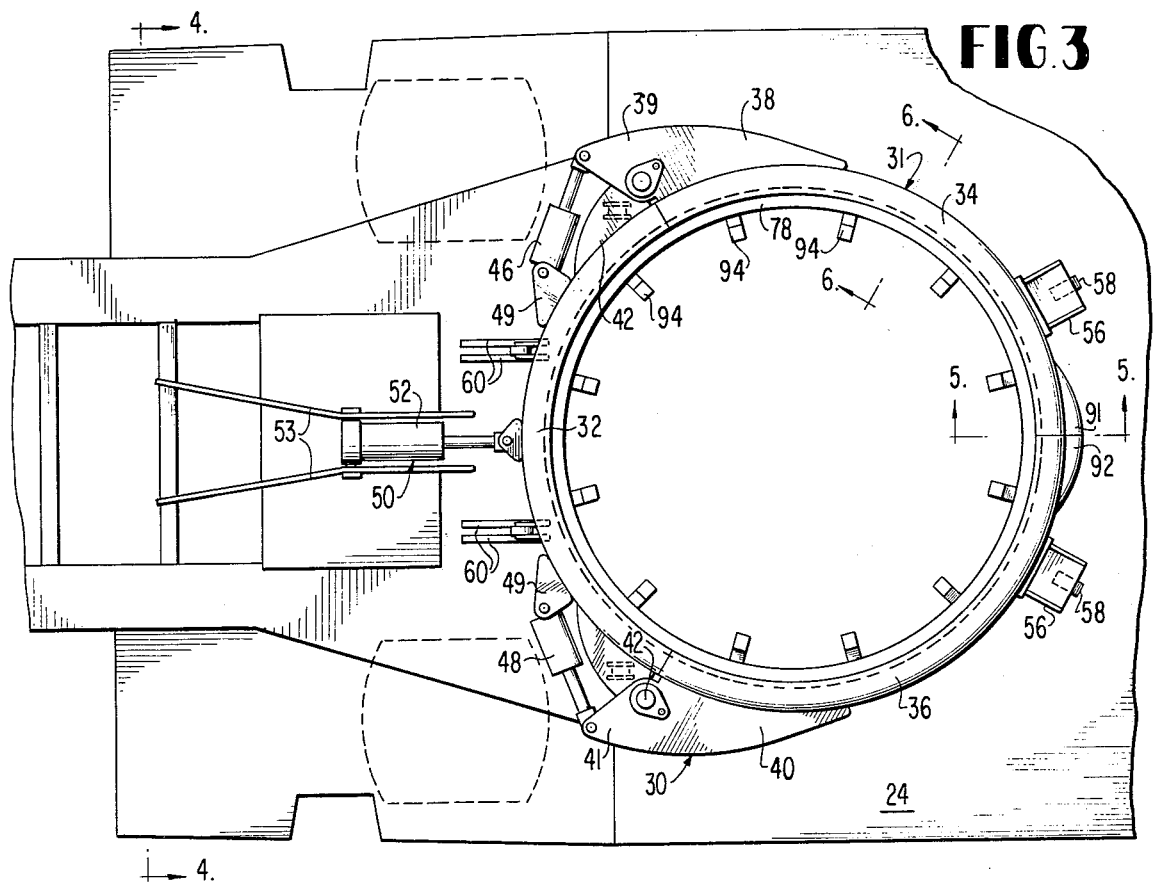
FIG. 3 is a partial plan view similar to FIG. 2 with the clamping ring in a closed configuration and with the superstructure removed for clarity.

The second and third arcuate segments 34, 36 are each provided with a mounting bracket 56 adjacent the free end remote from the pivot pins 44 associated therewith (see FIG. 3). Each bracket 56 supports a caster 58 for rolling motion about a horizontal axis and a rotary motion about a vertical axis. Thus, the casters 58 are adapted to support the respective arcuate segments 34, 36 during swinging movement thereof about the pivot pins 44 and during reciprocating movement of the clamping ring 31 in response to the hydraulic cylinder 52.

It will be noted from FIG. 4 that the deck 24 of the carrier may be provided with suitable roller guide means 60. The roller guide means 60 may comprise, for example, a pair of parallel members spaced slightly to each side of a roller 54 to ensure that the arcuate segment 32 will be laterally stabilized during movement toward and away from its closed position. Preferably, the roller guide means 60 are provided for the rollers 54 which are adjacent to the hydraulic cylinder 52. This positioning is preferred since the deck 24 of the carrier is very rigid in the vicinity of carrier frame means 61 and the hydraulic cylinder 52 and the rigidity will thus ensure that the guide means 60 are operative.

Figure 5:
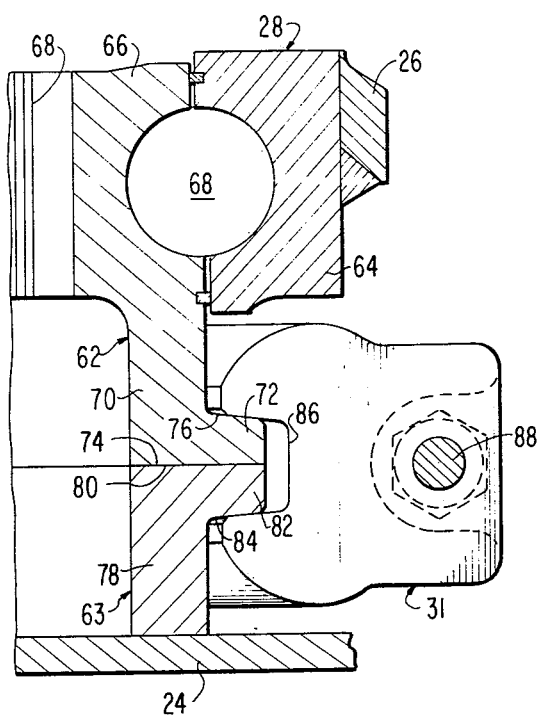
FIG. 5 is a partial cross-sectional view taken along line 5—5 of FIG. 3 with the superstructure added.

Turning now to FIG. 5, an attachment means 62 carried by a lower portion of the crane superstructure includes a generally radial protrusion and is supported by mounting means 63 which also includes a generally radial protrusion. The generally radial protrusions are connected by the segmented clamping ring 31 such that the attachment means 62 is securely fastened to the mounting means 63. As noted above, the crane superstructure preferably carries the turntable 28 when the superstructure is removed from the carrier deck 24. Accordingly, the attachment means 62 may comprise a downwardly extending portion of the turntable 28.

Typically, the turntable 28 may include an outer race 64 to which the crane superstructure is connected. The outer race 64 is rotatably supported with respect to an inner race 66 by means of suitable bearings such as the spherical balls 68 illustrated in FIG. 5. The inner periphery of the inner race 66 may be provided with suitable gear teeth 68 that may be engaged by a pinion (not shown) carried by and driven by the superstructure. Engagement between the pinion and the teeth 68 of the inner race 66 serves to drivingly rotate the superstructure with respect to the inner race 66 and the attachment means 62.

The attachment means 62 may include a cylindrical projection 70 depending downwardly from the inner race 66 of the turntable 28. The lowermost end of the cylindrical projection 70 is provided with a radially outwardly projecting protrusion or upper mating flange 72. The upper mating flange 72 includes a substantially radial mating surface 74 at its lowermost edge and a generally tapered cross-section. An upper frustoconical surface 76 may be provided which, in combination with the mating surface 74, defines the generally tapered cross section.

Extending upwardly from the deck 24 of the carrier is the mounting means 63 which may include the circular mounting support 78 that is suitably secured to the deck 24 of the carrier in any conventional manner. The circular mounting support 78 includes a generally radial protrusion or lower mating flange 82 having a generally radial mating surface 80 on which the mating surface 74 of the upper mating flange 72 is supported. The lower mating flange 82 is also tapered in cross section and may have a frustoconical lower surface 84 in order to define a convergently tapered mating flange.

With continued reference to FIG. 5, each arcuate segment of the segmented clamping ring 30 has a C-shaped cross section and includes a groove 86 which is adapted to receive the abutting mated flanges 72, 82 of the superstructure and the carrier respectively. The groove 86 may be provided with frustoconical upper and lower surfaces such that a double tapered groove is defined. Preferably, the cross sectional shape of the groove 86 conforms to the cross sectional shape of the abutted mating flanges 72, 82 so that the segmented clamping ring 31 provides a cam or wedging effect as the segmented clamping ring 31 is tightened around the abutting mating flanges 72, 82.

It is, of course, desirable to provide the cam or wedging effect to positively secure the attachment means 62 to the mounting means 63 and eliminate the possible relative motion therebetween. The desirability of preventing relative motion results from the fact that the inner race 66 of the turntable 28 must react forces induced by the pinion carried by the superstructure which engages the teeth 68 of the inner race 66 to turn the superstructure with respect to the carrier. The forces induced by the pinion may have a tendency to rotate the attachment means 62 were it not securely fastened to the mounting means 63.

To further improve the wedging effect, the segmented clamping ring 31 may be provided with suitable tensioning means for creating circumferential forces therein. The tensioning means in combination with small spaces between the adjacent ends of the arcuate segments 32, 34, 36 (see FIG. 3) allows the arcuate segments to move radially inwardly such that the double tapered groove 86 of the segmented clamping ring 31 moves onto the tapered mating flanges 72, 82 and thereby very tightly engages and secures the mating flanges 72, 82 against relative motion. A suitable tensioning means for the segmented clamping ring would be a conventional bolt 88 (see FIG. 5) to secure the ends of the arcuate segments 34, 36 together.

Returning to FIG. 2, the free or unpivoted end 89, 90 of the second and third arcuate segments 34, 36 respectively is provided with a suitable bracket 91, 92 for receiving the tensioning bolt 88.

Since the arcuate segments 32, 34, 36 are pivotally connected with the exception of the free ends 89, 90, which are connected with the bolt 88, it will be apparent that when the bolt 88 secures the free ends 89, 90 together, there is no longer any need for maintaining hydraulic pressure in the hydraulic cylinders 46, 48, 52 which articulate and move the segmented clamping ring 31. It is also to be noted that only a single bolt is now required to effect the assembly of the superstructure to the carrier in contrast to previously used methods. Accordingly, substantial savings of time and money are effected with the mounting clamp assembly.

Figure 6:
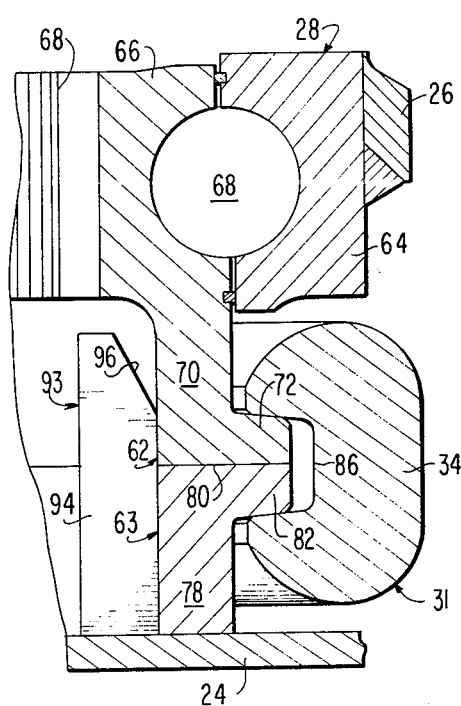
FIG. 6 is a partial cross-sectional view taken along line 6—6 of FIG. 3 with the superstructure added.

Considering the size and weight of the crane superstructure, it is desirable to provide suitable centering means 93 (see FIG. 6) to coaxially align the abutting mating flanges 72, 82. The centering means 93 may be carried directly by one mating portion, such as the mounting means 63, so that a portion of the centering means projects vertically upwardly above the mating surface 80 of the mounting means 63 in order to engage and align the attachment means 62, i.e. the other mating portion, carried by the crane superstructure.

In one embodiment, the centering means 93 may comprise a plurality of guides 94 welded to the inner periphery of the circular mounting support 78 such that a portion of each guide projects above the mating surface 80. The portion projecting above the mating surface 80 is provided with an inclined surface 96 which slopes radially inwardly above the inner periphery of the lower mating flange 82. As illustrated in FIG. 3 the plurality of guides 94 are preferably equiangularly spaced around the inner periphery of the mounting support 78.

Turning now to FIG. 7, the function of the guides 94 during the connection of the crane superstructure to the carrier is more readily visualized. As the superstructure carrying the attachment means 62 is lowered into abutment with the mounting support 78, the inner edge of the upper mating flange 72 will engage the inclined surface 96 of the guides 94 to both concentrically and coaxially position the mating flange 72 with respect to the lower mating flange 82. The centering means 93 illustrated in FIG. 7 comprises a generally passive centering means in that the centering means is static and is not provided with capacity for movement relative to the lower mating flange 82.

However, it is possible to provide an active or powered centering means 93 to properly position the crane superstructure with respect to the mounting support 78. For example, turning to FIG. 8, a curved pivotally mounted finger 98 is illustrated in operative position with respect to the deck 24, the mounting means 63 and the attachment means 62. Each finger 98 may be pivotally mounted about a suitable pin 100 to a bracket 102 carried below the deck 24 of the carrier. The finger 98 includes an arm 104 that may be actuated by conventional means such as an hydraulic cylinder 106. A portion of the curved finger 98 projects upwardly above the mating surface 80 of the mounting means 63.

With this alternate embodiment of the centering means 93 (FIG. 8) three of four hydraulically actuated fingers 98 would preferably be disposed equiangularly around the inner periphery of the mounting support 78. When the attachments means 62 carried by the crane superstructure is resting on the mounting support 78, the fingers 98 may be selectively actuated to concentrically and coaxially position the attachment means 62 with respect to the mounting means 63. Each finger 98 may rotate about the pin 100 between the positions depicted in FIG. 8 to effect the alignment. As used herein, crane is intended to embrace any motorized load handling device such as excavating machines, hoisting devices, building or road construction machinery and the like.

In operation, as the superstructure is lowered into position on the mounting support 78 the centering means 93 (see FIG. 7) concentrically and coaxially positions the attachment means 62 and the mounting means 63. With the mating flanges 72, 82 properly aligned with respect to one another, the hydraulic cylinder 52 (see FIG. 2) may be actuated to translate the segmented clamping ring 31 toward the mating flanges 72, 82 until the mating flanges 72, 82 are received and peripherally clamped by the tapered groove 86 of the first arcuate section 32.

When the groove 86 of the first arcuate section 32 has securely engaged the mating flanges 72, 82, the hydraulic cylinders 46, 48 are actuated to swing the second and third arcuate sections 34, 36 respectively about the pivot pins 44 until the groove 86 of each of the second and third arcuate sections 34, 36 is securely engaged with the mating flanges 72, 82. At this point the segmented clamping ring 31 is peripherally positioned substantially around the entire circumference of the abutting mating flanges 72, 82 as seen in FIG. 3. The segmented clamping ring is then tensioned by inserting and tightening the bolt 88 connecting the free ends 89, 90 of the second and third arcuate sections 34, 36. As noted above, the tensioning creates circumferential forces in the segmented clamping ring 31 and wedges the arcuate sections onto the abutted mating flanges 72, 82.

In disassembling the crane superstructure and carrier, the segmented clamping ring is disengaged from the abutting mating flanges 72, 82. During the disengagement the bolt 88 is first removed to allow relative motion between the free ends 89, 90 of the second and third arcuate sections 34, 36. Subsequently, the arcuate sections 34, 36 are pivoted about the pivot pins 44 by the hydraulic cylinders 46, 48 such that the arcuate segments release corresponding portions of the mating flanges 72, 82 with a pincer-like movement.

With the arcuate segments 34, 36 opened, the entire segmented clamping ring 31 is retracted such that the arcuate segment 32 is disengaged from the mating flanges 72, 82. Having thus moved the segmented clamping ring 31, the crane superstructure may be lifted away from the carrier for transportation independently thereof.

It is now apparent that there has been provided in accordance with this invention, a mounting clamp that substantially simplifies and facilitates the connection between a crane superstructure and a crane carrier. Although the present invention has been described in conjunction with specific embodiments thereof, it is evident that many alternatives, modifications, variations and equivalents will be apparent to those skilled in the art in light of the foregoing disclosure of the invention. Accordingly, it is expressly intended that all such alternatives, modifications, variations and equivalents which fall within the spirit and scope of the invention as defined in the appended claims, be embraced thereby.

What is claimed is:

1. In a large self propelled mobile crane of the type having a wheeled carrier supporting a revolvable superstructure provided with a boom carrying a load engaging tool and means for raising and lowering said tool, improved means for detachably securing said revolvable superstructure to said carrier so as to hold said superstructure firmly in place during operation of said tool and so as to permit convenient detachment of said superstructure from said carrier when it is desired to move the crane from one site to another, the improvement comprising:

mounting means carried by the carrier, being operable to support the revolvable superstructure, and having a first generally radial protrusion;

attachment means disposed at the bottom portion of the revolvable crane superstructure, operable to be supported by said mounting means, and including a second generally radial protrusion;

segmented clamp means for engaging said first generally radial protrusion and said second generally radial protrusion and fastening said mounting means and said attachment means together; and means to move the segmented clamp means to and from a clamping position in which the segmented clamp means fastens the first and second generally radial protrusions.

2. In a large self propelled mobile crane of the type having a wheeled carrier supporting a revolvable superstructure provided with a boom carrying a load engaging tool and means for raising and lowering said tool, improved means for detachably securing said revolvable superstructure to said carrier so as to hold said superstructure firmly in place during operation of said tool and so as to permit convenient detachment of said superstructure from said carrier when it is desired to move the crane from one site to another, the improvement comprising:
mounting means carried by the carrier, being operable to support the revolvable superstructure, and having a first generally radial protrusion;
attachment means disposed at the bottom portion of the revolvable crane superstructure, operable to be supported by said mounting means, and including a second generally radial protrusion; and
segmented clamp means for engaging said first generally radial protrusion and said second generally radial protrusion and fastening said mounting means and said attachment means together, said segmented clamp means including
a first arcuate section having two ends, and a groove for receiving said first and second protrusions,
a second arcuate section having a groove for receiving said first and second protrusions and being pivotally connected to one end of said first section, and
a third arcuate section having a groove for receiving said first and second protrusions and being pivotally connected to the other end of said first section.

3. The crane of claim 2 wherein said segmented clamp means includes:
articulating means for moving said second and third arcuate sections relative to said first arcuate section; and
positioning means for moving said first arcuate section relative to said mounting means.

4. The crane of claim 2 including:
tensioning means operable to engage said second and third arcuate sections and to secure said first and second projections in said groove of each arcuate section.

5. The crane of claim 2 wherein:
said first generally radial protrusion includes a substantially radial mating surface and a tapered lower surface which define a first tapered flange;
said second generally radial protrusion includes a substantially radial mating surface and a tapered upper surface which define a second tapered flange; and
the groove in each arcuate section of said clamping means includes tapered side surfaces that cooperate with the first and second tapered flanges to secure said attachment means to said mounting means.

6. In a crane including a revolvable superstructure, a boom, an engaging tool carried by the boom for engaging a load, a hoisting means, and a carrier to which the supersturcture is connected, the improvement comprising:
mounting means carried by the carrier, being operable to support the revolvable superstructure, and having a first generally radial protrusion;
attachment means disposed at a bottom portion of the revolvable crane superstructure, operable to be supported by said mounting means, and including a second generally radial protrusion;
segmented clamp means for engaging said first generally radial protrusion and said second radial protrusion and fastening said mounting means and said attachment means together;
means to move the segmented clamp means to and from a clamping position in which the segmented clamp means fastens the first and second generally radial protrusions; and
centering means carried by said mounting means, projecting toward said attachment means and operable to align said attachment means with respect to said mounting means.

7. The crane of claim 6 wherein said centering means includes a plurality of guides spaced about an inner periphery of said mounting means.

8. The crane of claim 6 wherein said first generally radial protrusion includes a first generally tapered flange, said second generally radial protrusion includes a second generally tapered flange, and said segmented clamp means engages said first and second generally tapered flanges.

9. In a crane including a revolvable superstructure, an engaging tool for engaging a load, means for operably connecting the engaging tool to the superstructure, hoisting means for the engaging tool, a carrier, and an improved means for detachably securing the revolvable superstructure to the carrier so as to hold said superstructure firmly in place during operation of the tool and so as to permit convenient detachment from the carrier when it is desired to move the crane from one site to another, the improvement comprising:
a clampable connector assembly for joining the superstructure to the carrier including mating portions carried by the superstructure and the carrier; and
centering means carried by the carrier, projecting toward the superstructure and operable to align the mating portions of the superstructure and the carrier for subsequent connection therebetween, the centering means including
a plurality of fingers pivotally mounted in substantially equiangularly spaced relation about a periphery of one mating portion and projecting therefrom, and
actuator means for moving each finger toward the other mating portion whereby the other mating portion is engaged by the projecting portion for alignment relative to the one mating portion.

10. The crane of claim 9 wherein said actuator means comprises a hydraulic cylinder attached at one end to the corresponding finger and attached at the other end to the carrier.

11. In a crane including a revolvable superstructure, an engaging tool for engaging a load, means for operably connecting the engaging tool to the superstructure, hoisting means for the engaging tool, a carrier, and an improved means for detachably securing the revolvable superstructure to the carrier so as to hold said superstructure firmly in place during operation of the tool and so as to permit convenient detachment from the carrier when it is desired to move the crane from one site to another, the improvement comprising:
a clampable connector assembly for joining the superstructure to the carrier including mating portions carried by the superstructure;
means to move the clampable assembly to and from a clamping position for joining the mating portions; and
centering means carried by the carrier, projecting toward the superstructure and operable to align the mating portions of the superstructure and the carrier for subsequent connection therebetween, the centering means including a plurality of guides in substantially equiangularly spaced relation about a periphery of one mating portion and projecting therefrom toward the other mating portion.

12. In a crane having a revolvable superstructure, an engaging tool for engaging a load, means operably connecting the engaging tool to the superstructure, a hoisting means for the engaging tool, and a wheeled carrier to which the superstructure is connected, the improvement comprising:
- mounting means carried by the carrier, being operable to support the revolvable superstructure, and having a first generally radial mating flange;
- attachment means disposed at a bottom portion of the revolvable crane superstructure, operable to be supported by said mounting means, and including a second generally radial mating flange;
- segmented clamp means for engaging said first generally radial mating flange and said second generally radial mating flange and fastening said mounting means and said attachment means together; and
- means to move the segmented clamp means to and from a clamping position in which the segmented clamp means fastens the first and second generally radial protrusions.

13. The crane of claim 12 including centering means carried by said mounting means, projecting toward said attachment means and operable to align said second radial mating flange with said first radial mating flange.

14. The crane of claim 12 wherein said segmented clamp means includes a pivot member having a pivot disposed at each end and a pair of pivotable arcuate sections, each arcuate section having a groove for receiving circumferential portions of the first and second generally radial mating flanges and being pivotally mounted about the pivot member for laterally swinging movement relative to the first and second generally radial mating flanges.

15. In a crane including a revolvable superstructure, a boom attached to the superstructure, an engaging tool carried by an end of the boom for engaging a load, a hoisting means carried by the superstructure, and a pneumatic-wheeled carrier to which the superstructure is connected, the improvement comprising:
- a first tapered flange mounted on the carrier, being operable to support the revolvable superstructure;
- a second tapered flange disposed at a bottom portion of the superstructure and operable to be supported by said first tapered flange;
- segmented clamp means including arcuate sections and being operable to engage said first tapered flange and said second tapered flange and to fasten the superstructure to the carrier;
- tensioning means operable to engage the arcuate sections and to cause radially inward force on said first tapered flange and said second tapered flange;
- articulating means for moving the arcuate sections relative to one another;
- positioning means for moving said segmented clamp means relative to said first tapered flange and said second tapered flange; and
- centering means carried by the carrier, projecting above said first tapered flange and operable to align said second tapered flange with respect to said first tapered flange.

* * * * *